United States Patent Office 3,780,108
Patented Dec. 18, 1973

3,780,108
CAGED KETONE
John R. E. Hoover, Glenside, and Robert John Stedman, Paoli, Pa., assignors to Smithkline Corporation, Philadelphia, Pa.
No Drawing. Application Oct. 4, 1966, Ser. No. 584,077, now Patent No. 3,536,761, which is a continuation-in-part of abandoned application Ser. No. 408,360, Nov. 2, 1964. Divided and this application Oct. 7, 1970, Ser. No. 78,930
Int. Cl. C07c 49/36
U.S. Cl. 260—586 A       1 Claim

ABSTRACT OF THE DISCLOSURE

Disclosed is the compound hexacyclo[6.2.1.1$^{3,6}$.0$^{4,10}$.0$^{5,9}$]dodecan-11-one and its use as an intermediate in the preparation of the corresponding caged amines having virus inhibiting properties.

This application is a division of copending application Ser. No. 584,077, filed Oct. 4, 1966, now U.S. Pat. No. 3,536,761 which application is a continuation-in-part of application Ser. No. 408,360, filed Nov. 2, 1964, now abandoned.

This invention relates to novel caged amines, to derivatives thereof, and to intermediates therefor. In particular, the invention relates to isomeric amino or aminomethyl hexacyclo-[6.2.1.1$^{3,6}$.0$^{2,7}$.0$^{4,10}$.0$^{5,9}$]dodecanes having virus inhibiting properties.

The principal compounds of the present invention are represented by the following structural formula:

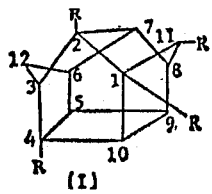

(I)

where one R group is amino, lower alkylamino, dilower alkylamino, lower acylamino, guanidino, or ureido; and the other three R groups are hydrogen. When at the 1,2 or 11-position, R may also be aminomethyl, lower alkylaminomethyl, diloweralkylaminomethyl, or lower acylaminomethyl.

The invention is most particularly concerned with the 1-amino, 2-amino, 4-amino, and 11-aminohexacyclo-[6.2.1.1$^{3,6}$.0$^{2,7}$.0$^{4,10}$.0$^{5,9}$]dodecanes.

The invention also relates to certain aminohexachlorohexacyclo[6.2.1.1$^{3,6}$.0$^{2,7}$.0$^{4,10}$.0$^{5,9}$]dodecanes, which are represented by the following structural formulas:

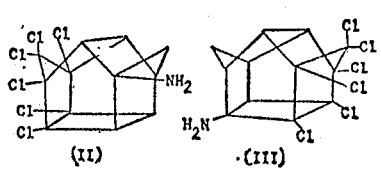 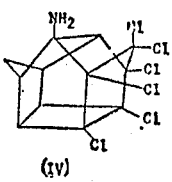

(II)          (III)          (IV)

The aminohexachlorohexacyclo caged Compounds II, III, and IV are intermediates useful for the preparation of the amino caged compounds of Formula I. In addition, the aminohexachlorohexacyclo caged compounds themselves possess virus-inhibiting properties.

The structures of the compounds of the present invention are confirmed by means of elemental analyses, infrared spectra, nuclear magnetic resonance spectra, and their modes of synthesis.

The terms lower alkyl and lower acyl are intended to refer to those alkyl and acyl groups having from one to four carbon atoms therein. Such groups would therefore include, for example, methyl, ethyl, propyl, butyl, acetyl, propionyl, and butyryl.

Included within the scope of the present invention are certain nonaminated hexacyclo, pentacyclo, and tetracyclo caged compounds which are useful intermediates and in addition possess virus-inhibiting properties.

Among these intermediate compounds included within the scope of the invention are 1-substituted hexacyclo-[6.2.1.1$^{3,6}$.0$^{2,7}$.0$^{4,10}$.0$^{5,9}$]dodecanes of Formulas V and VI,

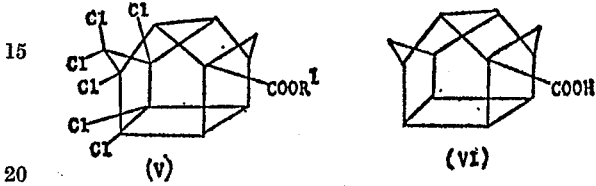

(V)                    (VI)

where R$^1$ is hydrogen or methyl.

A further compound within the scope of the invention is the tetracyclododecadiene of Formula VII.

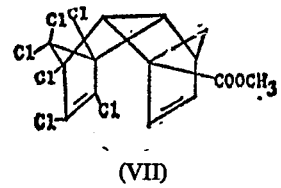

(VII)

These compounds are all useful as intermediates in the preparation of the virus-inhibiting aminohexacyclododecanes of the invention. In addition, the compound of Formula V, where R$^1$ is methyl, and the compound of Formula VII are active as inhibitors of the growth of influenza A virus.

Additional compounds within the scope of the present invention are the hexacyclo and tetracyclo compounds of Formulas VIII and IX,

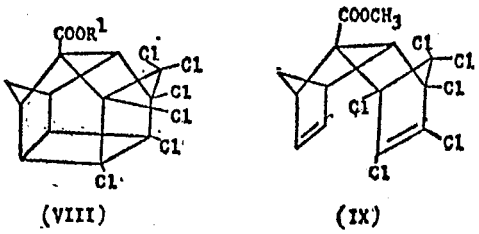

(VIII)                    (IX)

These compounds are useful as intermediates in the preparation of the virus-inhibiting aminohexacyclododecanes of the invention. In addition, the compound of Formula VIII, in which R$^1$ is methyl, and the compound of Formula IX are active as inhibitors of the growth of influenza A virus.

Additional compounds within the scope of the present invention are the tetracyclo and pentacyclo compounds of Formulas X and XI,

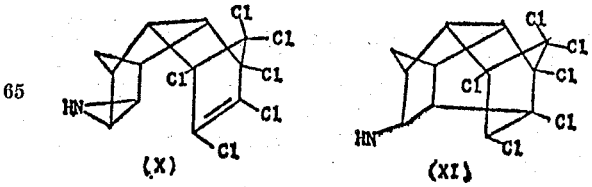

(X)                    (XI)

These compounds are useful as intermediates in the preparation of the virus-inhibiting aminohexacyclododecanes of the invention.

The hexacyclododecane caged compounds of the invention may be numbered by an alternative numbering system, other than that expressed above, and this system is set forth in Formula XII below.

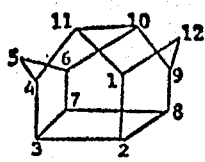

hexacyclo[7.2.1.0$^{2,8}$.0$^{3,7}$.0$^{4,11}$.0$^{6,10}$]dodecane (XII)

Either system is descriptive of the particular chemical compounds, but the system set forth in Formula I is used herein in order to be consistent with the numbering of certain precursor compounds.

The compounds of the invention are prepared by the following synthetic routes.

Compounds of Formula I with an amino group at the 1-position of the hexacyclododecane ring system are prepared by first heating at 150° C. methyl cyclopentadiene-1-carboxylate dimer (XIII) and 1,2,3,4,7,7-hexachlorobicyclo[2.2.1]hepta-2,5-diene (XIV) to form methyl 3,4,5,6,12,12 - hexachlorotetracyclo[6.2.1.1$^{3,6}$.0$^{2,7}$]dodeca-4,9-diene-1-carboxylate (VII).

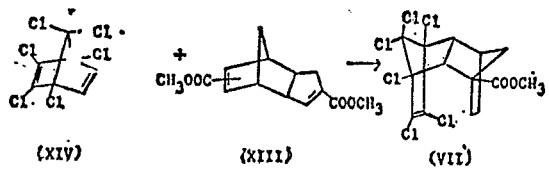

Compound VII is then irradiated with a mercury vapor lamp, thereby achieving double ring-closure to the full-cage compound V, in which R$^1$ is methyl. Saponification with alkali converts the ester to the acid V (R$^1$=hydrogen), which is dechlorinated with an active metal and an alcohol to the cage acid VI. The preferred reagent system is lithium metal and tert-butanol in tetrahydrofuran. This acid is then treated with a reagent such as thionyl chloride to form an acid chloride, converted to an acid azide with sodium azide, heated in a hydrocarbon solvent such as toluene to form an isocyanate, and then refluxed in an acetic acid-hydrochloric acid mixture for sixteen to eighteen hours to hydrolyze the isocyanate group to the primary amine XIV-A. This compound possesses virus-inhibitory

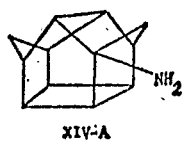

XIV-A activity against parainfluenza 1 virus, and has activity against PR 8 pneumonitis and swine influenza pneumonitis in mice.

The 1-aminohexachlorohexacyclododecane II is prepared by treating the hexachloro cage acid V (R$^1$=hydrogen) with ethyl chloroformate and then sodium azide, heating the so-formed acid azide in toluene to obtain an isocyanate, and then hydrolyzing the isocyanate as above to obtain the Product II. This compound is also effective as an inhibitor of the growth of parainfluenza 1 virus.

Compounds of Formulas I and IV with an amino group at the 2-position of the hexacyclododecane ring system are prepared by first heating at 55–65° C. cyclopentadiene and methyl 1,4,5,6,7,7 - hexachlorobicyclo[2.2.1]hepta-2,5-diene-2-carboxylate (XV) to form the ester IX. Compound XV is formed by

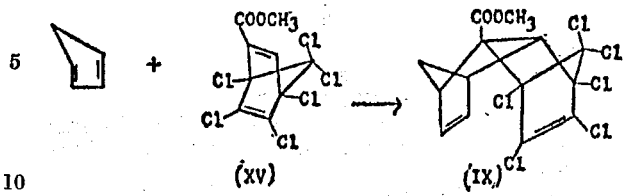

the Diels-Alder reaction of hexachlorocyclopentadiene and methyl propiolate. Irradiation of Compound IX with a mercury vapor lamp induces the formation of the full-cage ester VIII (R$^1$=methyl), which is saponified with aqueous alkali to the acid VIII (R$^1$=hydrogen). Conversion to the isocyanate, followed by hydrolysis yields 2 - amino - 1,8,9,10,11,11 - hexachlorohexacyclo[6.2.1.1$^{3,6}$.0$^{2,7}$.0$^{4,10}$.0$^{5,9}$]dodecane (IV). The dechlorinated amine XVI is prepared by reaction with an active metal and an alcohol, e.g. lithium and tert-butanol in tetrahydrofuran.

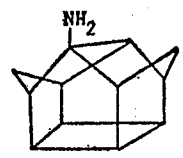

(XVI)

Compounds of Formulas I and III with an amino group at the 4-position of the hexacyclododecane ring system are prepared by first refluxing Isodrin (XVII) with p-toluene sulfonyl azide in the absence of light for twenty to thirty hours to form 1,8,9,10,11,11-hexachloro-4,5-(p-toluenesulfonylimido)tetracyclo[6.2.1.1$^{3,6}$.0$^{2,7}$]dodec - 9 - ene (XVIII). Reaction of

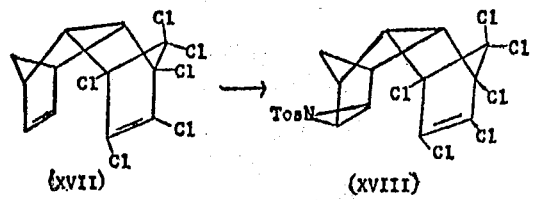

XVIII with trifluoroacetic acid produces the half cage 1,8,9,10,11,11-hexachloro - 4 - (p-toluenesulfonylimido)pentacyclo[6.2.1.1$^{3,6}$.0$^{2,7}$.0$^{5,9}$]dodecane (XIX).

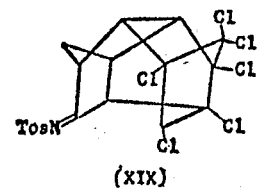

(XIX)

Fusion of Compound XIX with a base such as pyridine or with ammonium acetate at 125–160° for two to four hours results in the formation of the full cage compound 1,8,9,10,11,11 - hexachloro - 4 - (p-toluenesulfonamido)hexacyclo[6.2.1.1$^{3,6}$.0$^{2,7}$.0$^{4,10}$.0$^{5,9}$]dodecane (XX).

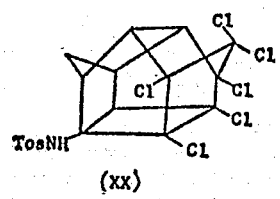

(XX)

The tosyl derivative XX can be hydrolyzed by heating with sulfuric acid to give the amine III, which is effective as an inhibitor of the growth of influenza A virus. Lithium-tert-butanol dechlorination results in the formation of the 4-amino-hexacyclododecane XXI.

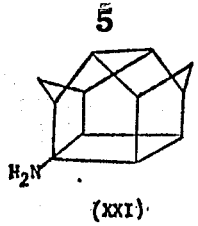

(XXI)

A modified route to the aminohexachlorohexacyclododecane III involves the reaction of Isodrin with tert-butoxycarbonyl azide to give an unisolated oily intermediate which, when treated with formic acid at room temperature, gives compound XXII. This compound on fusion with ammonium acetate gives the

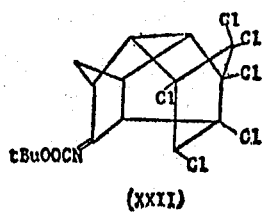

(XXII)

hexachloroamine III and its acetyl derivative. The intermediate XXII may also be treated with trifluoroacetic acid to give the imine XXIII,

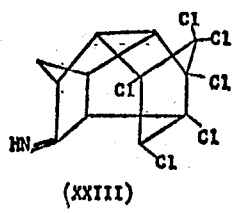

(XXIII)

which can be fused with ammonium acetate to give the hexachloroamine III. The oily intermediate may alternatively be passed through a neutral alumina column to give compound XXIV,

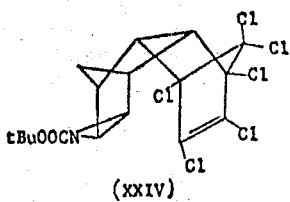

(XXIV)

which is converted by ethereal hydrogen chloride to the aziridine XXV.

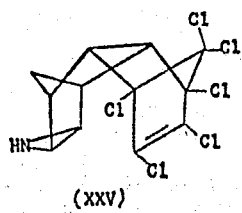

(XXV)

Compound XXV, in turn, is treated with acetic acid and hydrochloric acids to give the imine XXIII, which is convertible to the caged amine III.

Compounds of Formula I with an amino group at the 11-position of the hexacyclododecane ring system are prepared by treating tetrachlorocyclopentadienone cyclic ethylene ketal with 1,2,3,4,7,7-hexachlorobicyclo[2.2.1] hepta-2,5-diene to give compound XXVI, and then irradiating this diene to

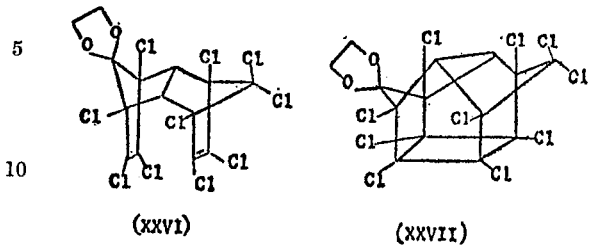

(XXVI)    (XXVII)

give the decachloro caged ketal XXVII, which as an important intermediate is part of this invention. This compound is dechlorinated with lithium and tert-butanol, the ketal is hydrolyzed with sulfuric acid to the ketone, the ketone is treated with hydroxylamine, and the resulting oxime is reduced with lithium aluminum hydride to give the final product, 11-aminohexacyclo[6.2.1.1$^{3,6}$.0$^{2,7}$.0$^{4,10}$. 0$^{5,9}$]dodecane (XXVIII). Alternatively, Compound XXVII is first hydrolyzed with sulfuric

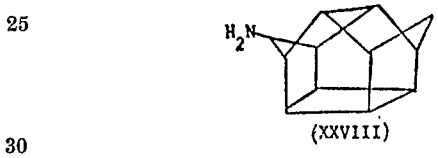

(XXVIII)

acid to the ketone, the ketone is converted to the oxime which is then reduced to the decachloroamine. Dechlorination of this compound yields the product XXVIII.

A third method for the formation of an 11-amino caged compound involves the reaction of cyclopentadiene and 1,2,3,4-tetrachlorobicyclo[2.2.1]hepta-2,5-dien-7-one ketal and irradiation of the resulting product to give Compound XXIX.

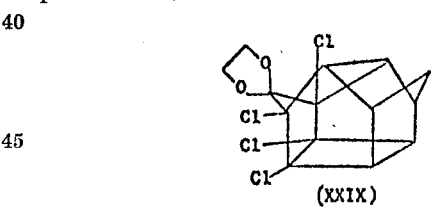

(XXIX)

This compound is then converted to compound XXVIII by methods described above.

Compounds of Formula I in which the R group at the 1 or 2-position is aminomethyl are prepared by treating the appropriate 1 or 2-carboxylic acid, either before or after dechlorination, with a reagent such as thionyl chloride to form the acid chloride, formation of the amide by reaction with aqueous or anhydrous ammonia, and then reduction to the aminomethyl compound with a reagent such as lithium aluminum hydride. Dechlorination may be carried out before the acid is converted to the acid chloride or following reduction of the amide to the aminomethyl compound. Alternatively, the carboxylic acid, either before or after dechlorination, may be reduced to the alcohol with a reagent such as lithium aluminum hydride or diborane, the alcohol converted to a halide, preferably the bromide with hydrogen bromide or phosphorus tribromide, and then aminated with anhydrous ammonia.

Compounds of Formula I in which the R group at the 11-position is aminomethyl are prepared by treating the 11-ketone with methoxymethylene triphenylphosphorane, generated from methoxymethyl triphenylphosphonium chloride and butyl lithium, in solvents such as tetrahydrofuran and diglyme. The resulting 11-methoxymethylene compound is then converted to an 11-carboxaldehyde by means of perchloric acid. The aldehyde is then treated with hydroxylamine to form an oxime, and the oxime reduced to the 11-aminomethyl compound with a reagent such as lithium aluminum hydride.

Compounds of Formula I in which R is other than primary amino are prepared as follows. The acetyl, propionyl, and butyryl compounds are prepared by treating the primary amine with acetic, propionic, or butyric anhydride, or the corresponding acid chloride, in pyridine. These amides may be reduced with lithium aluminum hydride in tetrahydrofuran to the corresponding ethylamino, propylamino, and butylamino compounds. A methylamino compound is prepared by treating the intermediate isocyanate with methanol to get a carbomethoxyamino compound, which is then reduced with lithium aluminum hydride to get a methylamino compound.

The dialkylated compounds are obtained by alkylating the sodium salt of an acylated amine with a reagent such as methyl, ethyl, propyl, or butyl iodide, and then reducing the amide with a reagent such as lithium aluminum hydride. Alternatively, an isocyanate may be treated with an alkanol to give a carboalkoxyamino compound, which may then be alkylated and then reduced to a dialkylamine. In a further variation, an isocyanate may be treated with an alkyl Grignard reagent to give an amide, which may then be alkylated and reduced to a dialkylamine.

Guanidino and ureido derivatives of the amino caged compounds are prepared by reaction of the amine with S-methylisothiourea sulfate or potassium cyanate, respectively.

It will be evident that the basic amino compounds of the present invention can be converted into their non-toxic, pharmaceutically acceptable acid addition salts. Such salts include, but are not limited to, the sulfate, hydrochloride, hydrobromide, citrate, pamoate, maleate, cyclohexylsulfamate, nitrate, acetate, tartrate, and succinate. Such salts are the full equivalents of the free bases and are included within the scope of this invention.

It will also be apparent to one skilled in the art of organic chemistry that, just as the dechlorinated primary amines of Formula I may be acylated or alkylated, so the virus-inhibitory hexachloro intermediates of Formulas II, III, and IV may be so acylated and alkylated. Such acylated and alkylated hexachlorohexacycloamines are within the scope of the present invention and are the full equivalents of the compounds as specifically claimed.

Also, certain carboxylic acids described herein can be readily esterified to their lower alkyl esters, and certain simple esters of carboxylic acids can likewise be readily hydrolyzed to the free acids. These variations are also obvious to one skilled in the art and they are thus to be considered as equivalent to the compounds specifically claimed.

In addition to the virus-inhibiting activity, compounds of the present invention also possess antimicrobial and central nervous system activities.

The compounds of the invention are useful for the purpose of preventing viral infections, particularly those caused by influenza viruses, and for combatting such infections which are already established. They are administered orally or subcutaneously in doses of about 25 mg./kg., preferably in the form of aqueous solutions of their pharmaceutically acceptable acid addition salts, or in standard tablet and capsule forms.

Since the 1 and 4-carbon atoms are asymmetric in those compounds in which the amino or aminomethyl group is attached to the 1 or 4-position, it is apparent that such 1 or 4-amino or aminomethyl products will exist in the form of racemic mixtures. Inasmuch as separation of racemic mixtures by various methods is known to the art of organic chemistry, the present invention is intended to embrace both the racemic mixtures and the separated optically active forms.

The following examples are illustrative of the compounds of the invention, but are not to be considered as limitative of the scope thereof.

EXAMPLE 1

Methyl 3,4,5,6,12,12-hexachlorotetracyclo[6.2.1.1$^{2,6}$.0$^{2,7}$]dodeca-4,9-diene-1-carboxylate

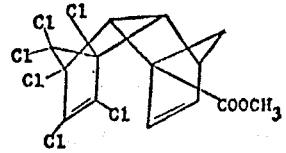

Methyl cyclopentadiene-1-carboxylate dimer (7.7 g., .031 mole) and 1,2,3,4,7,7 - hexachlorobicyclo[2.2.1]-hepta-2,5-diene (16.9 g., .057 moles) are maintained at 150° for five and one-half hours. The mixture is cooled and triturated with methanol. After cooling, a tan precipitate is filtered off, washed with methanol, and dried to give the title product, M.P. 96–98°. Recrystallization from 5% water-methanol raises the melting point to 98–100°.

EXAMPLE 2

Methyl 3,4,5,6,12,12-hexachlorohexacyclo[6.2.1.1$^{3,6}$.0$^{2,7}$.0$^{4,10}$.0$^{5,9}$]dodecane-1-carboxylate

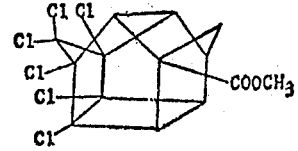

The tetracyclododecadiene of Example 1 (17.5 g., .0407 moles) is dissolved in 500 ml. of acetone and is irradiated with a 450 watt Hanovia mercury vapor lamp in a quartz apparatus for thirty minutes. Evaporation of solvent in vacuo and recrystallization of the residue from methanol gives the title product, M.P. 153.5–155°.

EXAMPLE 3

3,4,5,6,12,12-hexachlorohexacyclo[6,2,1,1$^{3,6}$.0$^{2,7}$.0$^{4,10}$.0$^{5,9}$]dodecane-1-carboxylic acid

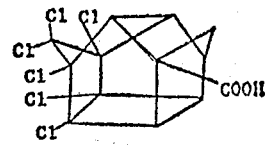

The hexacyclododecane of Example 2 (40.7 g., .096 moles) is suspended in 500 ml. of 95% ethanol and 500 ml. of 10% aqueous sodium hydroxide, and the mixture heated at reflux for two and one-half hours. The solution is evaporated to one-third volume, 600 ml. of water is added, and the suspension is acidified with conc. hydrochloric acid. After cooling, the precipitated acid is filtered off. Recrystallization from acetonitrile yields an analytical sample, M.P. 288.5–290° d.

EXAMPLE 4

Hexacyclo[6.2.1.1$^{3,6}$.0$^{2,7}$.0$^{4,10}$.0$^{5,9}$]dodecane-1-carboxylic acid

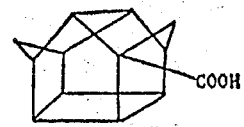

The hexachloro acid of Example 3 (25 g., .061 mole) is dissolved in 400 ml. of dry tetrahydrofuran. Tert-butanol (68.6 ml., 0.73 moles) is added, followed by 10.2 g. (1.46 moles) of lithium cut into small pieces, after which the entire apparatus is flushed with nitrogen. Spontaneous reflux begins after several minutes, necessitating control by means of an ice bath. Following this spontaneous reaction, the reaction mixture is refluxed an additional one-half hour, cooled, and poured onto one and one-half liters of ice water. When all the lithium has reacted, the mixture is acidified and then extracted with ethyl acetate. The organic phase is washed with diluted hydrochloric acid and filtered, and the solvent is evaporated to give an oil which crystallizes on standing to give the title product.

EXAMPLE 5

1-aminohexacyclo[6.2.1.1$^{3,6}$.0$^{2,7}$.0$^{4,10}$.0$^{5,9}$]dodecane

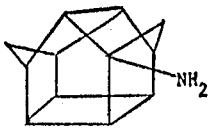

The acid of Example 4 (5.5 g., .0272 moles) is dissolved in 22 ml. of thionyl chloride and maintained at room temperature overnight under anhydrous conditions. The thionyl chloride is evaporated in vacuo at 50–55°, using benzene to azeotrope off the remaining traces. The liquid acid chloride is dissolved in 250 ml. of acetone and the solution chilled in an ice bath to 0–5°. A solution of 2.06 g. (.0317 moles) of sodium azide in 20.6 ml. of water is added, whereupon a precipitate is formed. The mixture is stirred at −5 to −10° for fifteen minutes, and water (350 ml.) is added. The oil which separates is extracted with 350 ml. of toluene and the toluene solution is washed with 300 ml. of water. The toluene solution is dried and then refluxed for an hour under a drying tube, and then evaporated to give an isocyanate.

The isocyanate is dissolved in 250 ml. of 4:1 acetic acid-hydrochloric acid and the solution refluxed for sixteen to eighteen hours, after which the solvents are evaporated. The oil is dissolved in 250 ml. of water, and the cloudy solution is boiled and treated with Darco. The solution is filtered, cooled, made alkaline, and then extracted with 1:1 benzene-ether. The organic phase is washed with water, filtered, and evaporated to give the amino product.

A hydrochloride salt is prepared by dissolving the amine in ether and adding an ethereal solution of hydrogen chloride. The salt does not melt below 350° and is recrystallized from isopropanol-ethyl acetate.

EXAMPLE 6

1-amino-3,4,5,6,12,12-hexachlorohexacyclo[6.2.1.1$^{3,6}$.0$^{2,7}$.0$^{4,10}$.0$^{5,9}$]dodecane

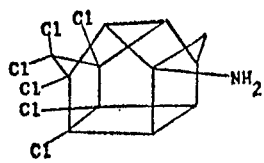

The hexachloro acid of Example 3 (4 g., .00976 mole) is dissolved in 14.4 ml. of dry tetrahydrofuran and 1.62 ml. (.01152 mole) of triethylamine is added. The solution is cooled to −5°, and a solution of 1.02 ml. (.0107 mole) of ethyl chloroformate in 5.8 ml. of tetrahydrofuran is added, after which a white precipitate forms. The mixture is stirred at −5–0° for thirty minutes and a solution of 1.27 g. (.0195 mole) of sodium azide in 7.4 ml. of water is added, as a result of which an oil separates out. The mixture is then stirred an additional thirty minutes, poured onto 40 ml. of ice water, and extracted with 100 ml. of toluene. The toluene extracts are washed with 100 ml. of water, dried, and then refluxed for an hour. The toluene is then evaporated to give the isocyanate.

The isocyanate is added to 100 ml. of 4:1 acetic acid-hydrochloric acid and refluxed for sixteen hours. The solvents are evaporated and the residual solid is suspended in 1:1 ether-benzene and stirred with 10% sodium hydroxide. The organic phase is washed with aqueous sodium hydroxide and water and evaporated to give the amine. The amine is purified by first suspending it in 30 ml. of conc. hydrochloric acid and 370 ml. of water and stirring for one hour, warming slightly in the beginning. A small amount of insoluble material is filtered off and the solution made basic with 10% sodium hydroxide. The precipitated amine is collected, washed with water, and dried to give the product. Recrystallization from 60:40 methanol-water gives the pure amine, M.P. 292–295° d.

EXAMPLE 7

Methyl 1,4,5,6,7,7-hexachlorobicyclo[2.2.1]hepta-2,5-diene-2-carboxylate

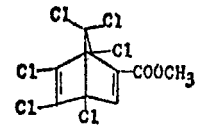

Methyl propiolate (45 g., 0.536 mole) and hexachlorocyclopentadiene (132 g., 0.485 mole) are refluxed at 125–130° for sixteen hours. The dark liquid is triturated with 100 ml. of methanol, forming a heavy yellow precipitate which is collected, washed with methanol, and dried. The compound is recrystallized from methanol and sublimed to give the title product, M.P. 86–88.5°.

EXAMPLE 8

Methyl 1,8,9,10,11,11-hexachlorotetracyclo[6.2.1.1$^{3,6}$.0$^{2,7}$]dodeca-4,9-diene-2-carboxylate

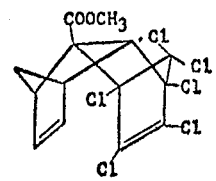

The bicyclo ester of Example 7 (10 g., .0336 mole) is heated to 55–65°, and a total of 20 ml. of freshly distilled cyclopentadiene is added, 5 ml. at a time, immediately, at two hours, four hours, and five and one-half hours. The reaction is stirred for a total of six and one-half hours at 55–65° and is then cooled. Petroleum ether, 30–60° (30 ml.) is added, and the solution is chilled and scratched, resulting in the formation of a white solid. The compound is recrystallized from 95% ethanol to give the title product, M.P. 147–148.5°.

EXAMPLE 9

Methyl 1,8,9,10,11,11-hexachlorohexacyclo[6.2.1.1$^{3,6}$.0$^{2,7}$.0$^{4,10}$.0$^{5,9}$]dodecane-2-carboxylate

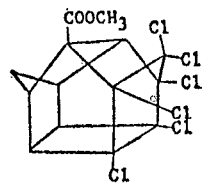

The tetracyclododecadiene of Example 8 (5.2 g., .0123 moles) is dissolved in 500 ml. of acetone and the solution is irradiated with a 450 watt Hanovia mercury vapor lamp in a quartz apparatus for thirty minutes (larger batches require one hour). The solution is evaporated in vacuo and the residue recrystallized twice from methanol to give the title product, M.P. 163–165°.

EXAMPLE 10

1,8,9,10,11,11-hexachlorohexacyclo[6.2.1.1$^{3,6}$.0$^{2,7}$.0$^{4,10}$.0$^{5,9}$]dodecane-2-carboxylic acid

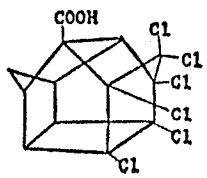

The hexacyclo ester of Example 9 (30 g., .0694 mole) is mixed with 400 ml. of 95% ethanol and 400 ml. of 10% aqueous sodium hydroxide, and the solution is refluxed for thirty-two hours. After cooling, the solution is evaporated in vacuo to one-third volume, 600 ml. of water is added, and the mixture is acidified with conc. hydrochloric acid. The precipitated compound is collected and recrystallized from ethyl acetate-hexane to give the title product, M.P. 365–370° d.

EXAMPLE 11

2-amino-1,8,9,10,11,11-hexachlorohexacyclo[6.2.1.1$^{3,6}$.0$^{2,7}$.0$^{4,10}$.0$^{5,9}$]dodecane

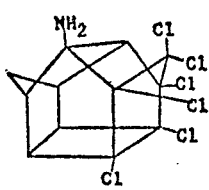

The hexacyclo acid of Example 10 (20 g., .0488 mole) is refluxed for two hours in 250 ml. of thionyl chloride. The thionyl chloride is evaporated in vacuo at 50–55°, using benzene to azeotrope the last traces. The acid chloride obtained is dissolved in 500 ml. of acetone and chilled to 0°, and a solution of 3.7 g. (.055 mole) sodium azide in 37 ml. of water is added. The cloudy orange mixture is stirred for fifteen minutes at 5–10° and 500 ml. of water is added, precipitating a white solid. The mixture is extracted with toluene, which is then washed with water, dried, and refluxed for an hour. Evaporation gives the isocyanate.

The isocyanate is dissolved in 500 ml. of 4:1 acetic acid-hydrochloric acid and the solution refluxed for sixteen hours. The solvent is evaporated and the residual solid dissolved in 200 ml. of ethanol and 500 ml. of water (with a few drops of hydrochloric acid). After filtration and addition of 25 ml. of ethanol, conc. ammonium hydroxide is added to pH 9. The precipitated solid is collected and recrystallized from ethanol-water to give the title product which does not melt below 350°.

EXAMPLE 12

2-aminohexacyclo[6.2.1.1$^{3,6}$.0$^{2,7}$.0$^{4,10}$.0$^{5,9}$]dodecane

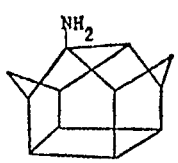

The hexachloro amine of Example 11 (23.5 g., .0618 mole) is dissolved in 400 ml. of tetrahydrofuran and 69.5 ml. (0.74 mole) of tert-butanol is added. Lithium (10.3 g., 1.48 moles) is then added in small pieces and the reaction is maintained under nitrogen. Including the spontaneous refluxing (controlled by ice bath), the reaction is refluxed for seventy mnutes, after which it is cooled and poured into one and one-half liters of ice water. When the lithium has all reacted, the mixture is extracted with 1:1 ether-benzene, the organic phase is washed with water, filtered, and evaporated to give the title product. A hydrochloride is prepared by dissolving the amine in ether and adding an ethereal solution of hydrogen chloride. Recrystallization from absolute alcohol-ethyl acetate gives the pure hydrochloride, which does not melt below 320°.

EXAMPLE 13

1,8,9,10,11,11-hexachloro-4,5-(p-toluenesulfonylimido)-tetracyclo[6.2.1.1$^{3,6}$.0$^{2,7}$]dodec-9-ene

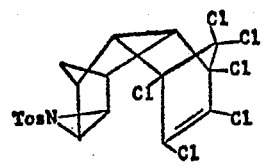

The preparation of p-toluenesulfonyl azide is a modification of the procedure of Doering and DePuy [J. Am. Chem. Soc. 75, 5955 (1953)]. Sodium azide (48.8 g., 0.75 mole) is dissolved in 200 ml. of water at 55°, diluted with 300 ml. of ethanol, and allowed to come to room temperature. To the resulting clear solution is added, during 10 minutes, with stirring, 90.3 g. (0.5 mole) of p-toluenesulfonyl chloride. Stirring is continued for a further one and one-third hours after completion of the addition. The temperature of the reaction mixture is kept between 21° and 25° throughout; ice-cooling is necessary during the addition and for about twenty minutes thereafter. During the reaction, an oil and a crystalline solid precipitate. Water (500 ml.) is then added, and the mixture extracted with 750 ml. of carbon tetrachloride in two portions. The combined extracts are washed with 800 ml. of water in five portions, dried over magnesium sulfate and used immediately.

To the p-toluenesulfonyl azide solution, made up to a volume of 950 ml. by adding more carbon tetrachloride, is added 183 g. (0.5 mole) of Isodrin (1,8,9,10,11,11-hexachlorotetracyclo[6.2.1$^{3,6}$.0$^{2,7}$]dodeca-4,9-diene). The mixture is allowed to stand at room temperature overnight, and then refluxed in the absence of light for thirty hours. Nitrogen is evolved slowly, and a solid product is deposited. The reaction mixture is cooled to about −10°, and the solid is collected and dried in air to give the title product, M.P. 231–233° d. This material is suitable for use in the next step. Recrystallization from acetonitrile gives colorless material, M.P. 238–239.5° d.

EXAMPLE 14

1,8,9,10,11,11-hexachloro-4-(p-toluenesulfonylimido)pentacyclo[6.2.1.1$^{3,6}$.0$^{2,7}$.0$^{5,9}$]dodecane

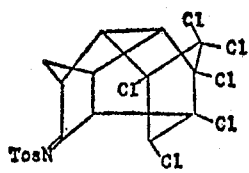

The tosyl aziridine of Example 13 (120 g., 0.225 mole) is added in portions during two-three minutes to 1010 ml. of trifluoroacetic acid at the reflux temperature. The aziridine dissolves, with slight heat evolution, to give a dark green solution. The reaction mixture is kept at the reflux temperature for a further four minutes after completion of the addition, and then cooled in ice. The title product which separates melts at 187.5°–289.5°. It is suitable for use in the next step. Recrystallization from isopropanol gives colorless material, M.P. 192–193°.

EXAMPLE 15

1,8,9,10,11,11-hexachloro-4-(p-toluenesulfonamido)hexacyclo[6.2.1.1$^{3,6}$.0$^{2,7}$.0$^{4,10}$.0$^{5,9}$]dodecane

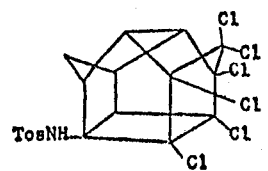

The tosylimido compound of Example 14 (120 g., 0.225 mole) is added to 1200 g. of fused ammonium acetate, and the mixture is stirred for three hours, the temperature being kept between 135° and 150° throughout. The reaction mixture is allowed to cool to 100°, and then diluted with two liters of water. The title product is collected as a grey powder, M.P. 250–262.5°, which is satisfactory for the next step. Recrystallization from acetic acid gives colorless material, M.P. 265–266°.

EXAMPLE 16

4-amino-1,8,9,10,11,11-hexachlorohexacyclo-[6.2.1.1$^{3,6}$.0$^{2,7}$.0$^{4,10}$.0$^{5,9}$]dodecane

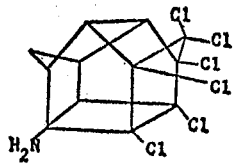

The tosylamine of Example 15 (60 g., 0.112 mole) and 120 ml. of sulfuric acid are heated at 110°–115° with stirring for one hour. The resulting dark brown solution is cooled and poured onto 750 g. of ice, precipitating a semisolid mass of material. Ethanol (50 ml.) is added to give a solution, which is decolorized with charcoal, diluted with 250 ml. of water, brought to pH 8–9 with concentrated aqueous ammonia, and cooled in ice. The white material which precipitates is used in the next step without purification. Recrystallization from ethanol-water gives the pure title compound, which blackens but does not melt below 320°.

EXAMPLE 17

4-aminohexacyclo[6.2.1.1$^{3,6}$.0$^{2,7}$.0$^{4,10}$.0$^{5,9}$]dodecane

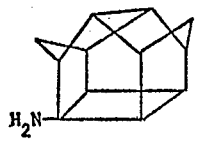

To a stirred solution of 30 g. (.079 mole) of the hexachloroamine of Example 16 in 520 ml. of dry tetrahydrofuran and 89 ml. (0.947 mole) of dry tert-butanol, there is added, in one portion, 13.18 g. (1.90 moles) of lithium wire, in approximately one inch pieces. The reaction is carried out in a nitrogen atmosphere. The reaction starts spontaneously, and the mixture begins to reflux a few minutes after the addition of the lithium. Intermittent ice cooling is necessary to moderate the reaction. The mixture maintains itself at the boiling point for about 20 minutes; it is then heated to keep it refluxing for a further forty minutes. Some small pieces of lithium remain at the end of the reaction. The mixture is poured into 1650 ml. of ice and water, and the product extracted with 600 ml. of 1:1 ether-benzene in two portions. The combined extracts are washed with 400 ml. of water and evaporated in vacuo to give the title product. This compound is dissolved in a mixture of 20 ml. each of tert-butanol acetonitrile. It is then stirred and a 15% solution of cyclohexylsulfamic acid in equal volumes of tert-butanol and acetonitrile is added until the mixture is acid to test paper. The colorless crystalline cyclohexylsulfamate salt of the product separates during the addition, and is collected after cooling. Recrystallization from tert-butanol-acetonitrile gives the salt.

EXAMPLE 18

Isodrin is heated in a little benzene on the steam bath with tert-butoxycarbonyl azide to give an oily product. Treatment of this compound with formic acid at room temperature gives 4-tert-butoxycarbonylimido-1,8,9,10,11,11 - hexachloropentacyclo[6.2.1.1$^{3,6}$.0$^{2,7}$.0$^{5,9}$]dodecane, M.P. 170–172°, from ethanol. Passage of the above oily product through a neutral alumina column gives 4,5-(tert-butoxycarbonylimido) - 1,8,9,10,11,11 - hexachlorotetracyclo[6.2.1.1$^{3,6}$.0$^{2,7}$]dodec-9-ene. This compound is treated with ethereal hydrogen chloride to obtain 1,8,9,10,11,11 - hexachloro - 4,5 - iminotetracyclo-[6.2.1.1$^{3,6}$.0$^{2,7}$]dodec-9-ene. This compound is converted to 1,8,9,10,11,11-hexachloro - 4 - iminopentacyclo[6.2.1.1$^{3,6}$.0$^{2,7}$.0$^{5,9}$]dodecane by refluxing in a mixture of acetic and hydrochloric acids. This imino compound is cyclized to the full caged amine of Example 16 by fusion with ammonium acetate. The above 4-tert-butoxycarbonylimidohexachloropentacyclododecane on fusion with ammonium acetate gives a mixture of the full caged amine of Example 16 and its N-acetyl derivative, M.P. 260–261°. This 4-tert-butoxycarbonylimido compound is alternatively converted to the above 4-iminopentacyclododecane with trifluoroacetic acid.

EXAMPLE 19

1,3,4,5,6,8,9,10,12,12 - decachlorohexacyclo[6.2.1.1$^{3,6}$.0$^{2,7}$.0$^{4,10}$.0$^{5,9}$]dodecane-11-one, cyclic ethylene ketal

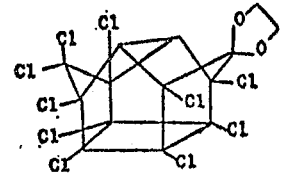

1,2,3,4,7,7 - hexachlorobicyclo[2.2.1]hepta - 2,5 - diene (460 g.) is heated in a 145° oil bath, and 45 g. (0.17 mole) of tetrachlorocyclopentadienone cyclic ethylene The mixture is heated at 145° for a total of about 6½ ketal is added in four equal portions at one hour intervals. hours and then cooled, 700 ml. of methanol is added, and the solution is scratched and chilled. The precipitate is collected and dried, and then stirred for ¾ hour in 1500 ml. of cyclohexane. The solution is filtered with the aid of charcoal, the filtrate evaporated in vacuo, and the resulting white solid recrystallized from absolute ethanol to give 1,3,4,5,6,8,9,10,12,12 - decachlorotetracyclo[6.2.1.1$^{3,6}$.0$^{2,7}$]dodeca-4,9-dien-11-one cyclic ethylene ketal, M.P. 227.5–229°.

The above diene (15.5 g.) is dissolved in 800 ml. of acetone and the solution is then irradiated with a 450 watt Hanovia Hg vapor lamp in a quartz apparatus for one hour and twenty minutes. The solvent is evaporated in vacuo and the residual white solid collected, washed with cold methanol, and recrystallized from absolute ethanol to give the title product, M.P. 183.5–185.5°.

EXAMPLE 20

Hexacyclo[6.2.1.1$^{3,6}$.0$^{2,7}$.0$^{4,10}$.0$^{5,9}$]dodecan-11-one

One inch pieces of lithium wire (6.6 g., 0.952 g-atoms) are added to a solution of 13.3 g. (.0238 mole) of the decachloro ketal of Example 19 in 200 ml. of dry tetrahydrofuran and 44.6 ml. (.476 mole) of tert-butanol. Nitrogen is bubbled through the reaction vessel and the mixture is stirred vigorously. Heat evolution is controlled by means of an ice bath and the mixture is allowed to reflux for a total of one hour, heat being applied as necessary. The mixture is cooled, an additional 22 ml. of tert-butanol and 3.3 g. of lithium wire are added, and the mixture is then cooled and poured into 1 liter of ice water. After the ensuing exothermic reaction has subsided, the mixture is extracted with 1:1 benzene-ether, and the organic phase is washed with water, filtered, and evaporated in vacuo. The residual yellow liquid is triturated with a small volume of methanol, chilled and scratched, and the resulting white solid collected. Recrystallization from methanol, followed by sublimation at 48–50°/.07–.09 mm. yields the title product as the cyclic ethylene ketal derivative, M.P. 67–69°.

This ketal (5 g.) is suspended in 50 ml. of 50% sulfuric acid and heated for one hour in a 50° oil bath. The mixture is cooled and poured into 500 ml. of ice water. The aqueous mixture is extracted with ether and the organic extracts are washed, dried, and evaporated in vacuo to give the title ketone product.

EXAMPLE 21

11-aminohexacyclo[6.2.1.1$^{3,6}$.0$^{2,7}$.0$^{4,10}$.0$^{5,9}$]dodecane

A solution of 10 g. of the ketone of Example 20, 15 g. of hydroxylamine hydrochloride, and 12 g. of sodium acetate in 200 ml. of methanol is refluxed for four hours. The solvent is then evaporated in vacuo, and the residue is partitioned between equal volumes of ether and saturated aqueous ammonium chloride. Evaporation of the dried ether layer gives the oxime derivative of the ketone.

A solution of 5 g. of the oxime in 100 ml. of ether is added slowly to a refluxing mixture of 20 g. of lithium aluminum hydride and 500 ml. of ether. Refluxing is then continued for four hours, the excess reagent is destroyed by cautious addition of saturated aqueous sodium sulfate, and excess dilute aqueous hydrochloric acid is then added. After equilibration, the aqueous layer is made strongly alkaline with sodium hydroxide and extracted with ether. Evaporation of the ether, following routine drying, gives the title product. Addition of excess dry hydrogen chloride to the dried ether solution of the product, followed by evaporation, gives the hydrochloride salt of the title product.

EXAMPLE 22

1-aminomethylhexacyclo[6.2.1.1$^{3,6}$.0$^{2,7}$.0$^{4,10}$.0$^{5,9}$]dodecane

A solution of 6 g. of hexacyclo[6.2.1.1$^{3,6}$.0$^{2,7}$.0$^{4,10}$.0$^{5,9}$]dodecane-1-carboxylic acid in 25 ml. of thionyl chloride is refluxed for 1 hour and then allowed to stand overnight at room temperature. After refluxing an additional hour, the excess thionyl chloride is removed in vacuo, the residual oil is dissolved in 10 ml. of benzene, and the solution further evaporated in vacuo to give the acid chloride. This compound is dissolved in 15 ml. of dry tetrahydrofuran and the solution is then added dropwise over a period of 2–3 minutes to 75 ml. of ice cold conc. aqueous ammonia. The solution is stirred for an hour, 25 ml. of water is added, and the resulting precipitate collected by filtration. Recrystallization gives the crystalline 1-carboxamide.

To a slurry of 3.04 g. of lithium aluminum hydride in 400 ml. of refluxing tetrahydrofuran under nitrogen is added over a period of 1 hour 3.75 g. of the 1-carboxamide. The mixture is then refluxed for 46 hours, cooled, and the excess hydride decomposed by dropwise addition of saturated aqueous sodium sulfate. The resulting white slurry is filtered, the filter cake washed with ether, and the combined filtrates evaporated in vacuo. The liquid residue is boiled with ether, any resulting water layer separated, and the ether layer dried and evaporated to give the 1-aminomethyl product. Treatment of an ether solution of this base with ethereal hydrogen chloride gives the crystalline hydrochloride salt.

Use of the 2-carboxylic acid in the above sequence of reactions instead of the 1-carboxylic acid results in the formation of the 2-aminomethyl product.

EXAMPLE 23

11-aminomethylhexacyclo[6.2.1.1$^{3,6}$.0$^{2,7}$.0$^{4,12}$.0$^{5,9}$]dodecane

A stirred suspension of 40 g. (0.105 moles) of methoxymethyl triphenylphosphonium chloride in 200 ml. of tetrahydrofuran and 20 ml. of diglyme is treated dropwise with 105 ml. (0.10 mole) of ethereal n-butyl lithium in a nitrogen atmosphere, and the mixture allowed to stir at 25° for 3 hours. To the resulting deep red solution is added dropwise a solution of 8.6 g. (.05 moles) of hexacyclo[6.2.1.1$^{3,6}$.0$^{2,7}$.0$^{4,10}$.0$^{5,9}$]dodecan-11-one in 40 ml. each of tetrahydrofuran and diglyme. The mixture is stirred at 25° for 4 hours, the tetrahydrofuran removed by heating on the steam bath, 20 ml. of diglyme is added, and the mixture then refluxed for 7 hours. The mixture is cooled, concentrated to one-half volume in vacuo, and treated with methyl bromoacetate to remove any triphenylphosphine. The mixture is allowed to stand for 12 hours, the solid is filtered off, and the filtrate washed with water. Evaporation of the dried organic layer gives an oil, which is chromatographed on an alumina column to give the 11-methoxymethylene hexacyclododecane.

This vinyl ether is allowed to stand at room temperature for 15 minutes in a saturated solution of ether in perchloric acid, poured into aqueous sodium bicarbonate, and extracted with ether. The ether is dried and evaporated to give the 11-carboxaldehyde.

A solution of this aldehyde, hydroxylamine hydrochloride, and sodium acetate in methanol is refluxed and worked up as in Example 21 to give the 11-oxime.

A solution of the oxime in ether is added to a refluxing mixture of lithium aluminum hydride and ether and then worked up as in Example 21 to give the 11-aminomethylhexacyclododecane.

EXAMPLE 24

1-propionamidohexacyclo[6.2.1.1$^{3,6}$.0$^{2,7}$.0$^{4,10}$.0$^{5,9}$]dodecane

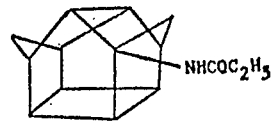

1-aminohexacyclo[6.2.1.1$^{3,6}$.0$^{2,7}$.0$^{4,10}$.0$^{5,9}$]dodecane prepared in Example 5, 3.46 g., .02 moles) is allowed to stand overnight with 5.2 g. of propionic anhydride in 100 ml. of pyridine. The reaction mixture is then diluted with ice water and the title product which precipitates is removed by filtration.

EXAMPLE 25

1-propylaminohexacyclo[6.2.1.1$^{3,6}$.0$^{2,7}$.0$^{4,10}$.0$^{5,9}$]dodecane

A solution of 2.3 g. (.01 mole) of the propionamido compound of Example 24 in 10 ml. of dry tetrahydrofuran is refluxed for 0.5 g. of lithium aluminum hydride for twelve hours. The excess hydride and the metal complex are then decomposed by the addition of acetone followed by water, the mixture is filtered, and the filtrate is evaporated to give the title product.

EXAMPLE 26

1-dipropylaminohexacyclo[6.2.1.1$^{3,6}$.0$^{2,7}$.0$^{4,10}$.0$^{5,9}$]dodecane

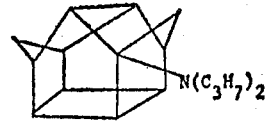

A solution of 2.3 g. (.01 mole) of the propionamido compound of Example 24 in 50 ml. of tetrahydrofuran is refluxed for two hours with 0.45 g. of 53.5% sodium hydride. A solution of 1.7 g. of propyl iodide in 25 ml. of tetrahydrofuran is added to the cooled reaction mixture which is then refluxed for twelve hours. The reaction mixture is filtered, the filtrate evaporated in vacuo, and water is cautiously added. The alkaline solution is extracted with ether, and the ether extracts dried and evaporated to give the N-propylpropionamido compound which is reduced to the title product with lithium aluminum hydride.

EXAMPLE 27

1-methylaminohexacyclo[6.2.1.1$^{3,6}$.0$^{2,7}$.0$^{4,10}$.0$^{5,9}$]dodecane

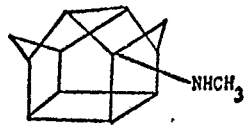

Hexacyclo[6.2.1.1$^{3,6}$.0$^{2,7}$.0$^{4,10}$.0$^{5,9}$]dodecene - 1 - isocyanate (prepared in Example 5, 3.98 g., .02 mole) is dissolved in 60 ml of methanol and is then refluxed for two hours. The solvent is evaporated in vacuo, 50 ml. of dry tetrahydrofuran is added to the resulting carbamate, and the mixture is refluxed with 0.76 g. of lithium aluminum hydride for four hours. The reaction mixture is decomposed with water, filtered, and evaporated to give the title product.

EXAMPLE 28

2-dimethylaminohexacyclo[6.2.1.1$^{3,6}$.0$^{2,7}$.0$^{4,10}$.0$^{5,9}$]dodecane The 2-aminoderivative of Example 12 (1.73 g., 0.1 mole) is mixed with 0.5 mole of 90% formic acid and 0.22 mole of 35% formaldehyde solution. The mixture is heated for twelve hours on the steam bath, 50 ml. of conc. hydrochloric acid is then added, and the mixture is evaporated to dryness in vacuo. To the residue is added 200 ml. of 1 N sodium hydroxide; the product is extracted with ether, and is obtained as the free base by drying and evaporating the ether, or else precipitated as a salt by adding an ethereal solution of the appropriate acid, such as hydrochloric acid.

EXAMPLE 29

2-ureidohexacyclo[6.2.1.1$^{3,6}$.0$^{2,7}$.0$^{4,10}$.0$^{5,9}$]dodecane

To a stirred refluxing solution of 2.1 g. (0.1 mole) of the 2-amino hydrochloride of Example 12 in 100 ml. water is added dropwise a solution of 8.9 g. (0.11 mole) of potassium cyanate. The mixture is refluxed for a further hour, cooled, and the crystalline product is collected.

EXAMPLE 30

4-guanidinohexacyclo[6.2.1.1$^{3,6}$.0$^{2,7}$.0$^{4,10}$.0$^{5,9}$]dodecane

A mixture of 1.73 g. (0.1 mole) of the 4-amino compound of Example 17 and 0.05 mole of S-methylisothiourea sulfate in 50 ml. each of water and ethanol is refluxed for twenty hours. Evaporation in vacuo gives the title product as its sulfate.

We claim:
1. Hexacyclo[6.2.1.1$^{3,6}$.0$^{2,7}$.0$^{4,10}$.0$^{5,9}$]dodecan-11-one.

References Cited

UNITED STATES PATENTS

| | | | |
|---|---|---|---|
| 3,538,160 | 11/1970 | Dunn et al. | 260—586 R X |
| 3,418,368 | 12/1968 | Dunn et al. | 260—586 R X |
| 3,456,008 | 7/1969 | Stedman | 260—586 R X |
| 3,096,239 | 7/1963 | Hoch et al. | 260—586 R X |
| 3,449,422 | 6/1969 | Miller | 260—586 R X |

BERNARD HELFIN, Primary Examiner

N. MORGENSTERN, Assistant Examiner